(12) United States Patent
Millner et al.

(10) Patent No.: US 8,834,599 B2
(45) Date of Patent: *Sep. 16, 2014

(54) METHOD AND DEVICE FOR OPERATING A SMELTING REDUCTION PROCESS

(75) Inventors: Robert Millner, Loosdorf (AT); Johannes Leopold Schenk, Linz (AT); Kurt Wieder, Schwertberg (AT)

(73) Assignee: Siemens Vai Metals Technologies GmbH (AT)

(*) Notice: Subject to any disclaimer, the term of this patent is extended or adjusted under 35 U.S.C. 154(b) by 141 days.

This patent is subject to a terminal disclaimer.

(21) Appl. No.: 13/125,691

(22) PCT Filed: Sep. 29, 2009

(86) PCT No.: PCT/EP2009/062607
§ 371 (c)(1),
(2), (4) Date: Aug. 10, 2011

(87) PCT Pub. No.: WO2010/046211
PCT Pub. Date: Apr. 29, 2010

(65) Prior Publication Data
US 2011/0283837 A1   Nov. 24, 2011

(30) Foreign Application Priority Data
Oct. 23, 2008  (AT) .................. A 1658/2008

(51) Int. Cl.
| | |
|---|---|
| C21B 5/06 | (2006.01) |
| C21B 11/00 | (2006.01) |
| F02K 3/00 | (2006.01) |
| F02C 1/00 | (2006.01) |
| C21B 7/00 | (2006.01) |
| C21B 13/00 | (2006.01) |
| F02C 6/00 | (2006.01) |

(52) U.S. Cl.
CPC . *C21B 5/06* (2013.01); *C21B 7/002* (2013.01); *C21B 13/00* (2013.01); *F02C 6/00* (2013.01)
USPC .................. 75/468; 75/433; 266/156

(58) Field of Classification Search
USPC .......................................... 75/468
See application file for complete search history.

(56) References Cited

U.S. PATENT DOCUMENTS

| | | | |
|---|---|---|---|
| 3,985,544 A * | 10/1976 | Collin et al. ........... | 75/10.16 |
| 4,861,369 A | 8/1989 | von Bogdandy et al. ..... | 75/38 |

(Continued)

FOREIGN PATENT DOCUMENTS

| | | | |
|---|---|---|---|
| CA | 2027350 A1 | 8/1990 | ........... C10J 3/57 |
| CA | 2741607 A1 | 4/2010 | ........... C21B 13/00 |

(Continued)

OTHER PUBLICATIONS

Fujisaki et al. Translation of WO2006/087803, Feb. 2006.*

(Continued)

*Primary Examiner* — Roy King
*Assistant Examiner* — Xiaowei Su
(74) *Attorney, Agent, or Firm* — Ostrolenk Faber LLP

(57) ABSTRACT

In a method and a device for operating a smelting reduction process, at least part of an export gas from a blast furnace or a reduction unit is thermally utilized in a gas turbine and the exhaust gas of this gas turbine is used in a waste heat steam generator to generate steam. The remaining part of the export gas is fed to a CO2 separation apparatus, the tail gas thereby obtained being fed to a waste heat steam generator and burned for additional steam generation. The combustible components of the tail gas are sent for thermal utilization in a steam generator, so that the overall energy balance of the thermal use of the export gas is improved. In addition, a further part of the export gas is qualitatively improved by the CO2 separation apparatus, so as to generate a high-quality reduction gas which can be supplied for metallurgical use.

12 Claims, 2 Drawing Sheets

(56) References Cited

U.S. PATENT DOCUMENTS

| | | | |
|---|---|---|---|
| 6,039,916 A * | 3/2000 | Celada-Gonzalez et al. | 266/82 |
| 6,237,320 B1 * | 5/2001 | Stats et al. | 60/780 |
| 6,478,841 B1 * | 11/2002 | Faccone et al. | 75/10.63 |
| 2002/0078795 A1 * | 6/2002 | Shigehisa et al. | 75/494 |
| 2012/0036961 A1 * | 2/2012 | Millner | 75/443 |

FOREIGN PATENT DOCUMENTS

| | | | | |
|---|---|---|---|---|
| CN | 1093411 A | 10/1994 | | C21B 11/00 |
| CN | 1131181 A | 9/1996 | | C10K 3/00 |
| DE | 2044644 A1 | 5/1972 | | C21B 5/06 |
| EP | 0269609 A1 | 6/1988 | | C21B 13/00 |
| EP | 0388395 A1 | 9/1990 | | C10J 3/57 |
| EP | 0488429 A2 | 6/1992 | | C21B 11/02 |
| GB | 2281311 A | 3/1995 | | C21B 5/00 |
| JP | 5263613 A | 10/1993 | | C21B 13/00 |
| JP | WO2006/087803 | * | 2/2006 | |
| JP | 2007170245 A | 7/2007 | | F02C 6/18 |
| WO | 2010/046211 A1 | 4/2010 | | C21B 13/00 |

OTHER PUBLICATIONS

ULCOS, the European Initiative for CO2-lean Steelmaking; Bror-Erik Sköld, MEFOS News (4 pages), Dec. 2006.

International Search Report and Written Opinion for Application No. PCT/EP2009/062607 (6 pages), Dec. 30, 2009.

* cited by examiner

METHOD AND DEVICE FOR OPERATING A SMELTING REDUCTION PROCESS

CROSS-REFERENCE TO RELATED APPLICATIONS

This application is a U.S. National Stage Application of International Application No. PCT/EP2009/062607 filed Sep. 29, 2009, which designates the United States of America, and claims priority to Austrian Application No. A 1658/2008 filed Oct. 23, 2008. The contents of which are hereby incorporated by reference in their entirety.

TECHNICAL FIELD

The invention relates to a method for operating a melt reduction process, in particular with a blast furnace or with a melting assembly and at least one reduction assembly, batch materials being reduced by means of a reduction gas, using carbon carriers and, if appropriate, aggregates, and being melted into pig iron or steel semifinished products, and the reacted reduction gas being diverted as top gas and being discharged, purified, as export gas.

BACKGROUND

The invention relates, further, to an apparatus for operating a melt reduction process, with a blast furnace or with a melting assembly and at least one reduction assembly, batch materials being reducible by means of a reduction gas, using carbon carriers and, if appropriate, aggregates, and being meltable into pig iron or steel semifinished products, and the reacted reduction gas being divertible as top gas and, purified, if appropriate mixed with purified and cooled excess gas from the melting assembly, being dischargeable as export gas.

It is known from the prior art that process gases, such as, for example, top gas from melt reduction devices, or a mixture of residual gases are treated in other processes and plants, the thermal and chemical energy of the top gas often being utilized. Problems are a fluctuating gas composition and the low export gas pressure downstream of the scrubber systems, which make a more efficient treatment of the export gases difficult. Further, it is known that the export gas or pure top gas is employed in turbines for the generation of kinetic energy (expansion turbines) and heat (gas turbines). Here, too, there is the problem that, on account of the low pressure, the low calorific value after the admixture of residual gas from a $CO_2$ removal plant and the calorific value fluctuations, the export gas can be used only in a disadvantageous way in a gas turbine or a combined-cycle power station.

SUMMARY

According to various embodiments, a method and an apparatus can be provided which give rise to a better and more efficient utilization of the process gases and an overall improved energy balance in the link between a melt reduction process and export gas utilization, for example, by a gas turbine or a combined-cycle power station.

According to an embodiment, in a method for operating a melt reduction process, in particular with a blast furnace or with a melting assembly and at least one reduction assembly, batch materials being reduced by means of a reduction gas, using carbon carriers and, if appropriate, aggregates, and being melted into pig iron or steel semifinished products, and the reacted reduction gas being diverted as top gas and, purified, if appropriate mixed with purified and cooled excess gas from the melting assembly, being discharged as export gas, wherein at least part of the export gas is utilized thermally in a gas turbine, and the exhaust gas from the gas turbine is used in waste heat steam generation for generating steam, at least a further part of the export gas being supplied to a device for the separation of $CO_2$, and the tail gas from this device being burnt in waste heat steam generation for the additional generation of steam.

According to a further embodiment, the top gas can be drawn off from the blast furnace or from the reduction assembly. According to a further embodiment, part of the export gas is first compressed, cooled and then supplied to the device for the separation of $CO_2$. According to a further embodiment, the export gas can be compressed in a fuel gas compressor before combustion in the gas turbine. According to a further embodiment, part of the export gas can be supplied to an expansion turbine, and it is expanded, along with a pressure reduction, and is subsequently admixed to the tail gas. According to a further embodiment, the tail gas, if appropriate after mixing with export gas, can be intermediately stored, before its combustion in the waste heat steam generation, in a storage device for the compensation of calorific value fluctuations. According to a further embodiment, the export gas can be dedusted before its combustion in the gas turbine. According to a further embodiment, metallurgical gases and/or natural gas and/or nitrogen and/or water vapor or mixtures thereof can be added for the compensation of calorific value fluctuations or for adapting the calorific value in the export gas before its combustion in the gas turbine. According to a further embodiment, the export gas can be buffered in a buffer device before its combustion in the gas turbine, in order to ensure an equalization of the export gas quantity or export gas calorific value. According to a further embodiment, the steam generated in the waste heat steam generation can be supplied to a steam turbine. According to a further embodiment, the device for the separation of $CO_2$ may operate on the basis of a pressure change or vacuum pressure change method, in particular according to the adsorption principle. According to a further embodiment, only export gas with a mean calorific value >4000 $kJ/Nm^3$, in particular >5000 $kJ/Nm^3$, can be supplied to the gas turbine. According to a further embodiment, the calorific value of the export gas can be determined online. According to a further embodiment, the fraction of the export gas which is supplied to the gas turbine may amount to 30 to 90% of the top gas. According to a further embodiment, the blast furnace can be operated with an oxygen-containing gas, in particular with an oxygen fraction >70%, particularly preferably >80%. According to a further embodiment, at least part of the export gas purified in the device for the separation of $CO_2$ can be introduced, if appropriate after heating, into the blast furnace or the reduction assembly. According to a further embodiment, at least part of the tail gas or gas mixtures with tail gas may be burnt in a heating device, with the addition of air and/or oxygen, the waste heat being used for heating the purified export gas before it is introduced into the blast furnace.

According to another embodiment, an apparatus for operating a melt reduction process as described above, may comprise a blast furnace or a melting assembly and at least one reduction assembly, batch materials being reducible by means of a reduction gas, using carbon carriers and, if appropriate, aggregates, and being meltable into pig iron or steel semifinished products, and the reacted reduction gas being divertible as top gas and, purified, if appropriate mixed with purified and cooled excess gas from the melting assembly, being dischargeable as export gas, wherein a gas turbine with a generator for the thermal reaction of at least part of the export gas is provided and waste heat steam generation, in which steam can be generated by means of the hot exhaust gases from the gas turbine, is provided, and a device for the separation of $CO_2$ is provided, to which at least part of the remaining export gas can be supplied, so as to form a gas purified of $CO_2$ and a tail gas, and a storage device for the absorption and compensation of calorific value fluctuations in the tail gas is provided, the storage device being connected to the waste heat steam generation which has a heating device for the combustion of the tail gas in order to form steam.

According to a further embodiment of the apparatus, a steam turbine with a generator for expanding the steam which has occurred in the waste heat steam generation is provided. According to a further embodiment of the apparatus, a buffer device for storing the export gas before it is supplied to the gas turbine is provided, so that the export gas quantity supplied to the gas turbine or the export gas calorific value can be kept uniform. According to a further embodiment of the apparatus, the buffer device may have a measuring device for measuring the calorific value of the export gas, while, based on the measurement, metallurgical gas and/or natural gas and/or nitrogen and/or water vapor can be supplied in order to adapt the calorific value. According to a further embodiment of the apparatus, a filter, in particular an electrostatic filter, for purifying the export gas before its compression and supply to the gas turbine may be provided. According to a further embodiment of the apparatus, a compressor for the pressure rise and/or a cooler for cooling the remaining part of the export gas before it is supplied to the device for the separation of $CO_2$ can be provided. According to a further embodiment of the apparatus, a fuel gas compressor for compressing the export gas before it is supplied to the gas turbine can be provided. According to a further embodiment of the apparatus, an expansion turbine for utilizing the pressure energy of the export gas can be provided, in which case the expanded export gas can be supplied to the storage device via a line. According to a further embodiment of the apparatus, a preheating device heatable by means of tail gas can be provided for heating the export gas purified of $CO_2$, so that the heated purified export gas can be supplied to the blast furnace.

DETAILED DESCRIPTION

Figure 1:
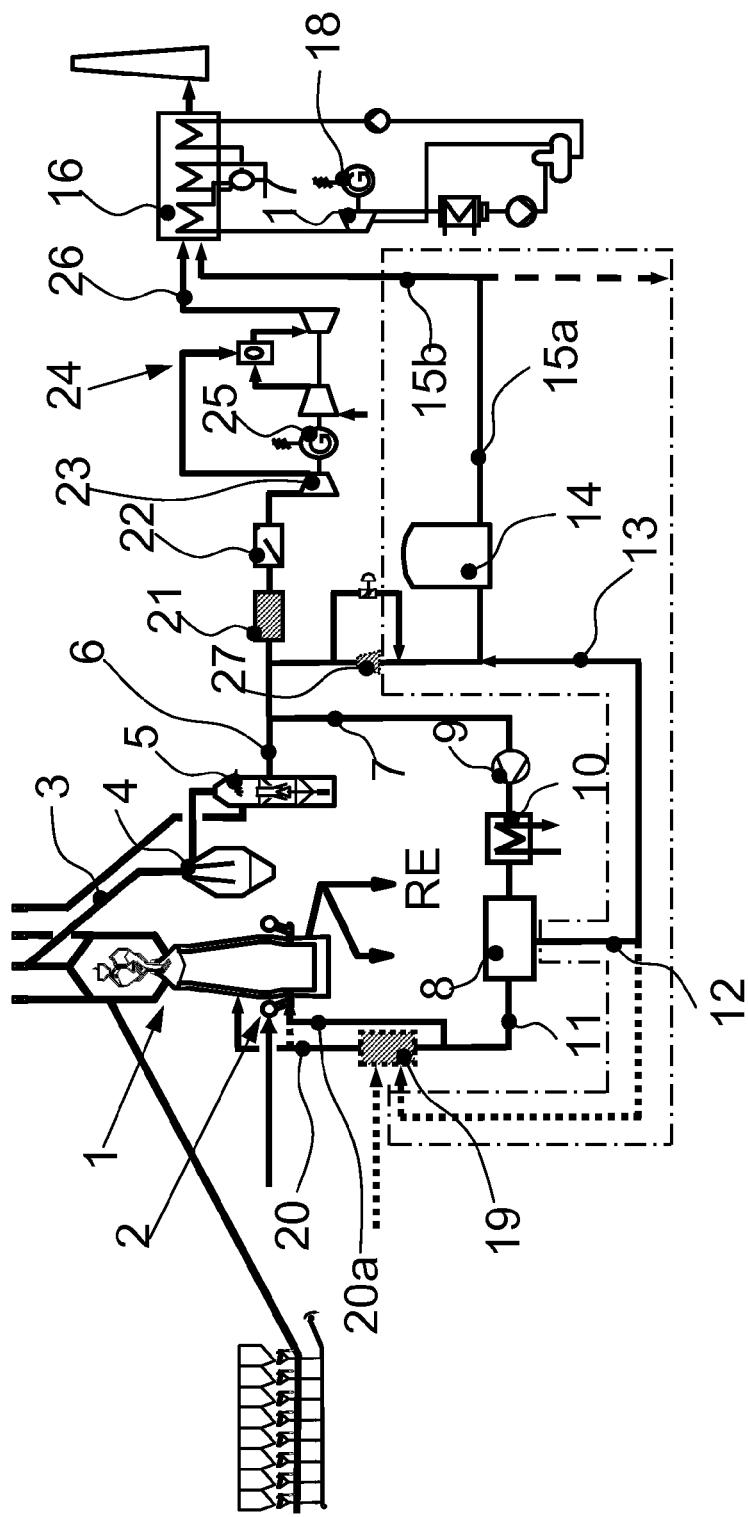
FIG. 1 shows a process diagram of a melt reduction process with a blast furnace operated by oxygen.

According to various embodiments, at least part of the export gas is utilized thermally in a gas turbine. The exhaust gas from this gas turbine is used in waste heat steam generation for generating steam. A further part of the export gas is supplied to a device for the separation of $CO_2$ and/or to the low-pressure export gas system, the tail gas which in this case occurs, that is to say the residual gas occurring due to the separation of the $CO_2$, being supplied to waste heat steam generation and being burnt for the additional generation of steam. As a result, on the one hand, the quality of the export gas is improved by the device for the separation of $CO_2$, and in this case the reduction potential of the export gas, that is to say its fraction of reducing components, is raised or a high-grade reduction gas is generated which can be supplied for metallurgical use. On the other hand, combustible fractions of the tail gas are supplied for thermal utilization, so that the energy balance is improved. It is in this case advantageous that the export gas, which has a higher pressure and a higher fraction of combustible components, is treated separately from the tail gas. Consequently, the quality of the export gas which is burnt in the gas turbine is not diminished by the tail gas, and therefore complicated pressure rises or else a lower energy output in the gas turbine are avoided. In particular, calorific value fluctuations, such as are unavoidable due to the process in the tail gas in the case of devices for the separation of $CO_2$, especially when $CO_2$ separation by means of adsorption methods is used, no longer present problems for the gas turbine. The efficient operation of gas turbines presupposes a fuel gas having a largely uniform calorific value, so that only advantages arise in the gas turbine due to a separate processing of the tail gas.

Since the reduction gas quantity from the melt gasifier is not uniform, a regulating gas quantity, what is known as excess gas, has to be locked out as export gas. The quantity of excess gas arises from as uniform a reduction gas quantity as possible required in the reduction assembly and from a regulation of the system pressure in the melting assembly.

According to an embodiment, the top gas is drawn off from the blast furnace or from the reduction assembly. In addition to a part stream being used in $CO_2$ separation, the export gas can be supplied to a gas turbine, and therefore the energy balance of the link between a melt reduction process and a gas turbine or waste heat steam generation can be markedly improved.

The purification of the top gas may take place by means of dry separation, in particular gravity separation, and/or wet separation. The top gas is mostly dust-laden, and therefore the dusts and fine solid particles have to be separated. Dry separation in this case affords the advantage that there is no sharp cooling of the top gas. If there are very stringent requirements as to the gas quality, an essentially complete removal of the dusts and solid particles may take place by means of wet dedusting, in which case this may follow dry dedusting or may also be used alone. Wet dedusting results in a sharp cooling of the top gas. The dry-purified or wet-purified top gas is designated as export gas and can then be supplied for utilization in a turbine.

According to various embodiments, the remaining part of the export gas is first compressed, cooled and then supplied to the device for the separation of $CO_2$. As a result of the pressure rise and the cooling, the process conditions for the separation of $CO_2$ can be adapted or improved.

According to an embodiment, the export gas is compressed in a fuel gas compressor before combustion in the gas turbine. The gas turbine can consequently be set at an economically optimal operating point and the efficiency can be increased.

According to an embodiment, part of the export gas is supplied to an expansion turbine, and it is expanded, along with a pressure reduction, and is subsequently admixed to the tail gas. By virtue of this measure, for example in the event of a surplus of export gas because the gas turbine can no longer process it, the pressure energy can first be utilized, the export gas being expanded. The turbine may be coupled to a generator for the generation of current. The expanded export gas is subsequently admixed to the tail gas, the fraction of combustible components rising overall.

According to an embodiment, the tail gas, if appropriate after mixing with export gas, is intermediately stored, before its combustion in the waste heat steam generation, in a storage device for the compensation of calorific value fluctuations. As a consequence of the process, the device for the separation of $CO_2$ generates a tail gas which has greatly varying calorific values, the fluctuations occurring with high frequency, that is to say occurring only briefly in time and largely being compensated reliably over a longer period. Thus, by means of compensation in intermediate storage, a virtually equalized calorific value can be set and sharp fluctuations in combustion can be avoided. By export gas being admixed to the tail gas, the calorific value can be further adapted.

In an embodiment, the export gas is dedusted before its combustion in the gas turbine. The additional dedusting can ensure that no damage in the turbine can be caused by residual dusts.

In a further an embodiment, metallurgical gases and/or natural gas and/or nitrogen and/or water vapor or mixtures thereof are added for the compensation of calorific value fluctuations or for adapting the calorific value in the export gas before its combustion in the gas turbine. Gas turbines require as uniform a heating power as possible and a uniform calorific value for stable operation. Fluctuations in the operation of the melt reduction process give rise to changes in the composition, so that, as a result of the introduction according to various embodiments of metallurgical gas, such as, for example, crucible gases or coke oven gases, available in sufficient quantities in metallurgical plants, or of other suitable combustible gases, the calorific value can, as required, be increased or, by the admixing of nitrogen, be lowered, so that stable conditions for the gas turbine can be ensured. The use of waste nitrogen from an air separation plant is particularly cost-effective.

According to an embodiment, the export gas is buffered in a buffer device before its combustion in the gas turbine, in order to ensure an equalization of the export gas quantity. By virtue of the measure described, a highly stable operation of the gas turbine can be ensured.

According to an embodiment, the steam generated in the waste heat steam generation is supplied to a steam turbine. By the steam formed in the waste heat steam generation being utilized, the efficiency of the process can be markedly increased.

According to an embodiment, the device for the separation of $CO_2$ operates on the basis of a pressure change or vacuum pressure change method, in particular on an adsorption basis. Methods of this type are distinguished by high separation rates, so that the purified export gas has a high reduction potential and can be utilized anew in the melt reduction process, with the result that the quantity of $CO_2$ generated per tonne of pig iron can be reduced.

According to an embodiment, only export gas with a mean calorific value >4000 kJ/Nm$^3$, in particular >5000 kJ/Nm$^3$, is supplied to the gas turbine. Control via the calorific value of the export gas can ensure that the gas turbine achieves a high efficiency, while the dedusting, the buffer device and the fuel gas compressor can have smaller dimensioning, since export gas with too low a calorific value does not have to be supplied to the turbine via these devices. More cost-effective components up to and including the gas turbine are therefore obtained. Further, as a result, the energy loss due to the otherwise necessary compression of $CO_2$-rich tail gas and to a subsequent expansion in the gas turbine is avoided.

According to a further embodiment, the calorific value of the export gas is determined online. By the determination of the calorific value being carried out online, it is possible to regulate the calorific value continuously, in particular by the admixture of combustible gases or nitrogen, thereby making an even more stable operation of the gas turbine possible.

According to a further embodiment, the fraction of the export gas which is supplied to the gas turbine amounts to 30 to 90% of the top gas. On the basis of this quantity, on the one hand, a utilization of the combustible components of the export gas is possible, while sufficient export gas can still be supplied to the device for the separation of $CO_2$, so that utilization in the melt reduction process is possible. The fractions may also be adapted, as required, for example if more export gas is to be recirculated in the melt reduction process.

According to a further embodiment, the blast furnace is operated with an oxygen-containing gas, in particular with an oxygen fraction >70%, particularly preferably >80%. By virtually pure oxygen being used for operation, the quality of the process gas during reduction, but also that of the top gas, are increased, so that there is a higher fraction of reducing or combustible components. The melt reduction process in the blast furnace and the thermal utilization of the export gas can consequently be improved.

According to a further embodiment, at least part of the export gas purified in the device for the separation of $CO_2$ is introduced, if appropriate after heating, into the blast furnace or the reduction assembly. The export gas thus purified has a high reduction potential and can therefore be used anew for reducing the batch materials, so that, for example, the quantity of carbon carriers in the blast furnace or in the reduction assembly can be reduced. Conventional batch materials are in this case iron ores, agglomerated iron ore carriers (pellets, sinter), iron ore concentrates and, in addition, carbon carriers and aggregates.

According to a further embodiment, at least part of the tail gas or gas mixtures with tail gas is burnt in a heating device, with the addition of air and/or oxygen, the waste heat being used for heating the purified export gas before it is introduced into the blast furnace. The export gas can consequently be heated cost-effectively in order to set the gas temperature necessary for introduction.

The apparatus according to various embodiments for operating the melt reduction process has a blast furnace or a melting assembly and at least one reduction assembly, batch materials being reduced by means of a reduction gas, using carbon carriers and, if appropriate, aggregates, and being melted into pig iron or steel semifinished products. The reduction gas reacted in the melt reduction process is diverted as top gas and, purified, if appropriate mixed with purified and cooled excess gas from the melting assembly, is discharged as export gas. Further, a gas turbine with a generator for the thermal reaction of at least part of the export gas and waste heat steam generation are provided, in the latter of which steam can be generated by means of the hot exhaust gases from the gas turbine. The apparatus according to various embodiments has a device for the separation of $CO_2$, to which the at least part of the remaining export gas can be supplied, so as to form a gas purified of $CO_2$ and a tail gas, and a storage device for the absorption and compensation of calorific value fluctuations in the tail gas, the storage device being connected to the waste heat steam generation which has a heating device for the combustion of the tail gas in order to form steam. By means of the apparatus according to various embodiments, the export gas, which has a high pressure and a high calorific value, can be processed separately from the tail gas which has a low pressure and a lower calorific value. Consequently, although the quantity of high-grade export gas is smaller, the latter is distinguished by the higher pressure and the higher calorific value, so that its utilization in the gas turbine can take place more efficiently. As a result of the separate combustion of the tail gas in the heating device of the waste heat steam generation, the energy of the combustible components in the tail gas can be utilized. According to an embodiment, a steam turbine with a generator for expanding the steam which has occurred in the waste heat steam generation is provided. Owing to the utilization of the waste heat from the hot exhaust gas of the gas turbine and of the waste heat from the combustion of the tail gas, the energy efficiency of the process can be increased, while the steam turbine can be used for current generation by being coupled to a generator.

To purify the top gas, a dry separation device, in particular gravity separation and/or a wet separation device may be provided. The required purity of the export gas can consequently be set, dry separation having the advantage of only slight cooling of the top gas.

According to a further embodiment, a buffer device for storing the export gas before it is supplied to the gas turbine is provided, so that the export gas quantity supplied to the gas turbine or the export gas calorific value can be kept uniform.

According to a further embodiment, the buffer device has a measuring device for measuring the calorific value of the export gas, while, based on the measurement, metallurgical gas and/or natural gas and/or nitrogen and/or water vapor can be supplied in order to adapt the calorific value. By means of online measurement, a regulation of the calorific value or of the export gas quantity can be implemented, while the quantity of export gas or of admixed metallurgical gas and/or nitrogen can be set by means of actuating members, such as, for example, regulating valves.

According to a further embodiment, a filter, in particular an electrostatic filter, for purifying the export gas before it is supplied to the gas turbine is provided. This fine filtration, if appropriate after a preceding dust filtration in the top gas, ensures that the gas turbine is not subjected to abrasive or mechanical load and even the finest dusts are separated.

According to a further embodiment, a compressor for the pressure rise and/or a cooler for cooling the remaining part of the export gas before it is supplied to the device for the separation of $CO_2$ are/is provided. This is necessary in order, via an appropriate adaptation of the temperature and pressure, to allow optimal operation of the device for the separation of $CO_2$ and subsequent utilization as reduction gas.

According to a further embodiment, a fuel gas compressor for compressing the export gas before it is supplied to the gas turbine is provided. The charging of the gas turbine can consequently take place at the pressure level coordinated with the gas turbine.

According to a further embodiment, an expansion turbine for utilizing the pressure energy of the export gas is provided, in which case the expanded export gas can be supplied to the storage device via a line. Thus, the pressure energy can first be utilized before the export gas is mixed with the tail gas in the storage device. The expansion turbine may be coupled to a generator for current generation.

According to a further embodiment, a preheating device heatable by means of tail gas is provided for heating the export gas purified of $CO_2$, so that the heated purified export gas can be supplied to the blast furnace. Due to the combustion of the tail gas in the heating device, it is possible to heat the purified export gas cost-effectively before it is recirculated into the blast furnace.

FIG. 1 shows a blast furnace 1 which is fed with oxygen via the ring line 2. The top gas is supplied via a top gas discharge line 3 to a dry separation device 4 and, if appropriate, also to a wet separation device 5, the dust-laden top gas giving rise to the export gas which is discharged via the line 6. By means of a delivery line 7 to the device for the separation of $CO_2$ 8, part of the export gas is supplied by means of a compressor 9 and a cooler 10 to the device for the separation of $CO_2$ 8, an export gas purified of $CO_2$, which is also designated as recycle gas, and a tail gas then being formed, which are discharged via the recycle gas line 11 and the tail gas line 12 and 13 respectively. The tail gas line 13 issues in a storage device 14 for receiving the tail gas, calorific value compensation occurring in the stored tail gas. By means of tail gas delivery lines 15a, 15b, the previously stored tail gas can then be supplied to a waste heat steam generator 16. Here, as a result of the combustion of the tail gas, steam is generated which drives a steam turbine 17 and a generator 18, current being generated.

In a special type of operation of the method according to various embodiments, the tail gas may also be utilized for heating the recycled export gas, the tail gas being supplied to a preheating device 19 in which the tail gas is burnt and recycle gas is heated, the heated recycle gas then being introduced into the blast furnace 1 via a delivery line 20. The preheating device may in this case even be bypassed and the recycle gas be introduced directly into the blast furnace via a delivery line 20a. In addition to the use of the export gas for producing recycle gas, the export gas serves, above all, as an energy carrier, and in this case the chemical energy and the pressure energy can be utilized. The export gas is supplied to a buffer device 21 and a filter 22. Here, on the one hand, the regulation of as uniform an export gas quantity as possible and the regulation of as uniform a calorific value as possible take place, the latter being set by the addition of metallurgical gas or nitrogen. For this purpose, the calorific value of the export gas is measured online in the buffer device, and the calorific value is raised by the addition of metallurgical gas or natural gas or is lowered by the addition of nitrogen or water vapor.

The export gas thus treated is added via a fuel gas compressor 23 to the combustion chamber of a gas turbine 24 which, in turn, drives a generator 25. The hot exhaust gas which in this case occurs is supplied via exhaust gas lines 26 to the waste heat steam generation 16 in order to generate steam, the steam, in turn, being processed in the steam turbine 17.

Alternatively, part of the export gas or even the predominant part of the export gas may be supplied to an expansion turbine 27, this turbine being coupled to a generator, not illustrated. The expanded export gas can then be supplied to the storage device 14 in which the expanded export gas is then mixed with the tail gas.

Figure 2:
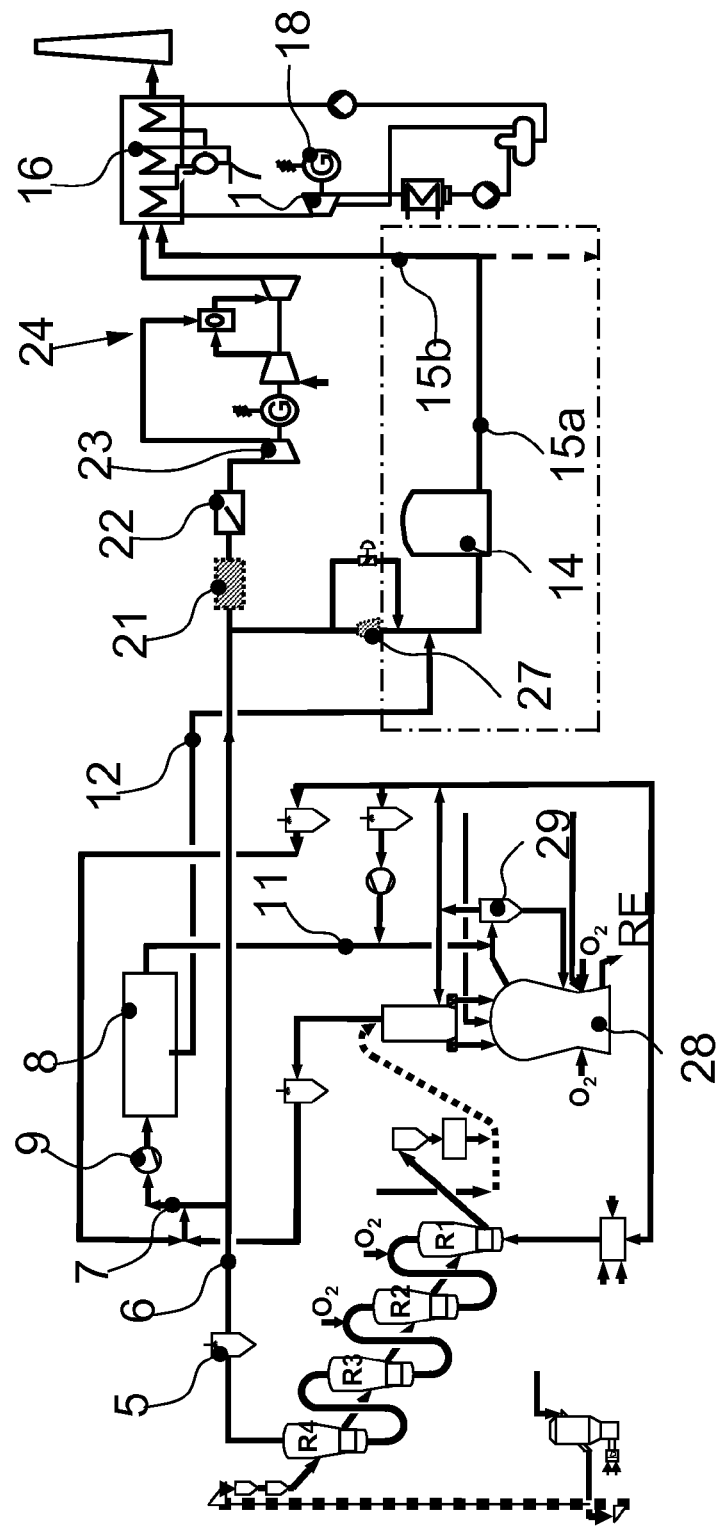
FIG. 2 shows a process diagram of a melt reduction process with a melt reduction plant according to COREX® (agglomerate ore) or FINEX® (fine ore).

FIG. 2 shows a plant or process diagram similar to FIG. 1, and therefore identical components have been designated by the same reference numerals. Instead of the blast furnace, the melt reduction process is carried out in a melting assembly 28 and at least one reduction assembly R. In the concrete example, 4 series-connected reduction assemblies R1, R2, R3 and R4 are arranged, which use a reduction gas formed in the melting assembly in order to reduce the batch materials, in particular iron ore, agglomerated iron ore carriers (pellets, sinter) or ore concentrates. The melting assembly 28 is advantageously designed as a melt gasifier. The reduction assemblies are routed in countercurrent to the batch materials and, after use in the reduction assemblies, are drawn off as top gas at the last reduction assembly R4 and purified in a wet separation device 5. The then purified top gas can be supplied, in a similar way to the description of FIG. 1, as export gas to the gas turbine 23 or to the device for the separation of $CO_2$ 8. The tail gas is, in turn, supplied to the storage device 14 via the tail gas line 12. The purified export gas, which is also designated as recycle gas, can be supplied to the generator gas dedusting device 29 via the recycle gas line 11. In the generator gas dedusting device 29, the generator gas generated in the melting assembly 28, using carbon carriers, is dedusted and is supplied as process gas or as reduction gas to the reduction assembly R1. The material at least partially reduced in the reduction assemblies is designated as low reduced iron (LRI)

and, after agglomeration, is introduced into the melting assembly 28 where it is then melted into pig iron or into steel semifinished products.

LIST OF REFERENCE SYMBOLS

1 Blast furnace
2 Gas ring line
3 Top gas discharge line
4 Dry separation device
5 Wet separation device
6 Line
7 Delivery line
8 Device for the separation of $CO_2$
9 Compressor
10 Cooler
11 Recycle gas line
12 Tail gas line
13 Tail gas line
14 Storage device
15$a$, 15$b$ Tail gas delivery lines
16 Waste heat steam generator
17 Steam turbine
18 Generator
19 Preheating device
20, 20$a$ Delivery line
21 Buffer device
22 Filter
23 Fuel gas compressor
24 Gas turbine
25 Generator
26 Exhaust gas lines
27 Expansion turbine
28 Melting assembly
29 Generator gas dedusting device

The invention claimed is:

1. A method for operating a melt reduction process with a blast furnace or with a melting assembly and at least one reduction assembly, comprising:
   reducing batch materials by means of a reduction gas, using carbon carriers, and melting the batch materials into pig iron or steel semifinished products,
   diverting the reacted reduction gas as top gas and discharging the top gas, purified, as export gas,
   providing at least a first part of the export gas to be utilized thermally in a gas turbine, and using exhaust gas from the gas turbine in waste heat steam generation for generating steam, the first part of the export gas containing $CO_2$,
   wherein the fraction of the export gas which is supplied to the gas turbine amounts to 30 to 90% of the top gas,
   providing at least a second part of the export gas to a device for the separation of $CO_2$, tail gas from the device for separation of $CO_2$ being burnt in waste heat steam generation for the additional generation of steam, wherein the tail gas is intermediately stored, before its combustion in the waste heat steam generation in a storage device for the compensation of calorific value fluctuations, wherein at least part of the export gas purified in the device for the separation of $CO_2$ is introduced into the blast furnace or the reduction assembly, and wherein the fraction of the export gas which is supplied to the gas turbine and the fraction purified in the device for the separation of $CO_2$ are based on the requirement of the melt reduction process,
   supplying at least a third part of the export gas to an expansion turbine, where the at least a third part of the export gas is subjected to expansion and pressure reduction, and
   admixing the at least the third part of the export gas that was subjected to expansion and pressure reduction to the tail gas prior to being burnt in waste heat steam generation.

2. The method according to claim 1, wherein the top gas is drawn off from the blast furnace or from the reduction assembly.

3. The method according to claim 1, wherein part of the export gas is first compressed, cooled and then supplied to the device for the separation of $CO_2$.

4. The method according to claim 1, wherein the export gas is compressed in a fuel gas compressor before combustion in the gas turbine.

5. A method for operating a melt reduction process with a blast furnace or with a melting assembly and at least one reduction assembly, comprising:
   reducing batch materials by means of a reduction gas, using carbon carriers, and melting the batch materials into pig iron or steel semifinished products,
   diverting the reacted reduction gas as top gas and discharging the top gas, purified, as export gas,
   thermally utilizing at least a first part of the export gas in a gas turbine, the first part of the export gas containing $CO_2$,
   using exhaust gas from the gas turbine in waste heat steam generation for generating steam,
   supplying at least a further second part of the export gas to a device for separation of $CO_2$, and
   providing the tail gas from the device for separation of $CO_2$ to be burnt in waste heat steam generation for the additional generation of steam,
   wherein the export gas is dedusted and at least one of metallurgical gases, natural gas, nitrogen, and water vapor or mixtures thereof are added for the compensation of calorific value fluctuations or for adapting the calorific value in the export gas before its combustion in the gas turbine, and
   wherein the fraction of the export gas which is supplied to the gas turbine amounts to 30 to 90% of the top gas, and
   wherein at least part of the export gas purified in the device for the separation of $CO_2$ is introduced into the blast furnace or the reduction assembly, and wherein the fraction of the export gas which is supplied to the gas turbine and the fraction purified in the device for the separation of $CO_2$ are based on the requirement of the melt reduction process.

6. The method according to claim 1, wherein the export gas is buffered in a buffer device before its combustion in the gas turbine, in order to ensure an equalization of the export gas quantity or export gas calorific value.

7. The method according to claim 1, wherein the steam generated in the waste heat steam generation is supplied to a steam turbine.

8. The method according to claim 1, wherein the device for the separation of $CO_2$ operates on the basis of a pressure change or vacuum pressure change method according to the adsorption principle.

9. The method according to claim 1, wherein only export gas with a mean calorific value >4000 kJ/Nm$^3$ or >5000 kJ/Nm$^3$, is supplied to the gas turbine.

10. The method according to claim 1, wherein the calorific value of the export gas is determined online.

11. The method according to claim 1, wherein the blast furnace is operated with an oxygen-containing gas with an oxygen fraction >70% or >80%.

12. The method according to claim 1, wherein at least part of the tail gas or gas mixtures with tail gas is burnt in a heating device, with the addition of at least one of air and oxygen, the waste heat being used for heating the purified export gas before it is introduced into the blast furnace.

* * * * *